(12) United States Patent
Marchal et al.

(10) Patent No.: US 12,012,140 B2
(45) Date of Patent: Jun. 18, 2024

(54) HOSPITAL CART FOR TRANSPORTING A CYLINDER OF GAS, IN PARTICULAR OF MEDICAL NO

(71) Applicant: INOSYSTEMS, Antony (FR)

(72) Inventors: Frédéric Marchal, Antony (FR); Nicolas Tirilly, Antony (FR)

(73) Assignee: INOSYSTEMS, Antony (FR)

( * ) Notice: Subject to any disclaimer, the term of this patent is extended or adjusted under 35 U.S.C. 154(b) by 71 days.

(21) Appl. No.: 17/954,763

(22) Filed: Sep. 28, 2022

(65) Prior Publication Data

US 2023/0099470 A1    Mar. 30, 2023

(30) Foreign Application Priority Data

Sep. 29, 2021  (FR) ..................... 2110265

(51) Int. Cl.
*B62B 3/10*   (2006.01)
*B62B 3/04*   (2006.01)
(Continued)

(52) U.S. Cl.
CPC ............... *B62B 3/104* (2013.01); *B62B 5/00* (2013.01); *B62B 5/06* (2013.01); *B62B 3/04* (2013.01);
(Continued)

(58) Field of Classification Search
CPC .. B62B 3/104; B62B 5/00; B62B 5/06; B62B 3/04; B62B 2202/022; B62B 2203/44; B62B 2301/044; B62B 5/061; F17C 13/08; F17C 2205/013; F17C 2205/0161; F17C 2270/025; F17C 2201/0109; F17C 2201/032; F17C 2201/056;
(Continued)

(56) References Cited

U.S. PATENT DOCUMENTS 7,836,882 B1 * 11/2010 Rumph ............. A61M 16/0093
128/204.21
8,726,900 B1 * 5/2014 Nashed ............. A61M 16/0833
128/203.15
(Continued)

FOREIGN PATENT DOCUMENTS

CN    113060198 A  *  7/2021
CN    113147870 A  *  7/2021
(Continued)

OTHER PUBLICATIONS

Search Report for FR2110265, dated May 31, 2022, 8 pages.

*Primary Examiner* — James A Shriver, II
*Assistant Examiner* — Ian Bryce Shelton
(74) *Attorney, Agent, or Firm* — Quantum Patent Law Firm; Seongyoune Kang (57) ABSTRACT

Disclosed is a mobile cart including a base for accommodating one or more gas cylinders, castors, a main column extending upwards from the base, a stowage cabinet arranged along the main column, an anchoring structure arranged at an upper end of the main column, a support post carried by the anchoring structure and equipped with fixing unit for a gas delivery apparatus, and a manual gripping handle allowing a user to manipulate the cart. Use of such a mobile cart to transport one or more cylinders of gas, in particular a NO/N2 mixture and/or oxygen, and a gas delivery apparatus.

14 Claims, 7 Drawing Sheets

(51) Int. Cl.
*B62B 5/00* (2006.01)
*B62B 5/06* (2006.01)

(52) U.S. Cl.
CPC ..... *B62B 2202/022* (2013.01); *B62B 2203/44* (2013.01); *B62B 2301/044* (2013.01)

(58) Field of Classification Search
CPC .......... F17C 2201/058; F17C 2221/011; F17C 2221/014; A61M 2202/0208; A61M 2202/0283; A61M 16/12; A61M 2209/084; A61M 16/104
See application file for complete search history.

(56) References Cited

U.S. PATENT DOCUMENTS

| | | | | |
|---|---|---|---|---|
| 8,814,107 | B2* | 8/2014 | Hampe | F16M 11/04 248/220.21 |
| 9,050,990 | B1* | 6/2015 | Zalewski | B62B 1/10 |
| 10,201,564 | B2 | 2/2019 | Potenziano et al. | |
| 10,661,045 | B2* | 5/2020 | Bathe | A61M 16/04 |
| 11,504,462 | B2* | 11/2022 | Hyde | A61M 60/00 |
| 2009/0121592 | A1* | 5/2009 | De Nando | A61M 16/01 312/209 |
| 2009/0302178 | A1* | 12/2009 | Hampe | F16M 11/04 248/187.1 |
| 2013/0106073 | A1* | 5/2013 | Gamard | B62B 3/104 280/79.2 |
| 2015/0075525 | A1* | 3/2015 | Ahearn | A61M 16/024 128/203.14 |
| 2016/0095779 | A1* | 4/2016 | Canady | A61B 50/15 280/79.2 |
| 2016/0310693 | A1* | 10/2016 | Bathe | A61M 16/104 |
| 2017/0363247 | A1* | 12/2017 | Koehler | A61M 5/1413 |
| 2018/0079438 | A1* | 3/2018 | Intravatola | F17C 13/085 |
| 2018/0265112 | A1* | 9/2018 | Yang | B60B 33/0002 |
| 2020/0188624 | A1* | 6/2020 | Nelson Mock | A61M 16/104 |
| 2020/0290660 | A1* | 9/2020 | Wright | A61B 50/13 |
| 2021/0259796 | A1* | 8/2021 | Danilkin | A61B 50/13 |
| 2022/0304759 | A1* | 9/2022 | Hansen | A61G 12/001 |

FOREIGN PATENT DOCUMENTS

| | | | | |
|---|---|---|---|---|
| CN | 113440703 A | * | 9/2021 | |
| DE | 202008010388 U1 | * | 2/2009 | ............ F17C 13/085 |
| DE | 102018121078 A1 | * | 3/2020 | |
| EP | 0 560 928 | | 9/1997 | |
| EP | 1 516 639 | | 7/2007 | |
| EP | 1 977 712 | | 10/2008 | |
| EP | 2 574 361 | | 4/2013 | |
| EP | 2574361 A1 | * | 4/2013 | ........ A61M 16/0084 |
| EP | 3 854 368 | | 7/2021 | |
| EP | 3 854 660 | | 7/2021 | |
| FR | 2 926 728 | | 1/2008 | |
| FR | 2 910 362 | | 6/2008 | |
| KR | 20210001838 A | * | 1/2021 | |
| WO | WO-2021134372 A1 | * | 7/2021 | ........... A61G 12/008 |
| WO | WO-2021206237 A1 | * | 10/2021 | ............. F16C 13/06 |

* cited by examiner

HOSPITAL CART FOR TRANSPORTING A CYLINDER OF GAS, IN PARTICULAR OF MEDICAL NO

This application designates the U.S. and claims priority to FR 2110265 filed Sep. 29, 2021, the entire contents of each of which are hereby incorporated by reference.

BACKGROUND OF THE INVENTION

Field of the Invention

The invention relates to a mobile hospital cart permitting simultaneous transport of one or more pressurized gas cylinders and of a gas delivery apparatus, in particular for medical NO, in order to be able to deliver the gas to a patient requiring same, in particular in a hospital environment, especially in intensive care units.

Description of the Related Art

Nitric oxide or NO is a gaseous medicament used to treat various medical conditions in a patient, such as persistent pulmonary hypertension of the newborn (PPHN), acute respiratory distress syndrome (ARDS) observed mainly in adults, or pulmonary hypertension (PH) in cardiac surgery, as disclosed in particular by EP-A-560928, EP-A-1516639 or U.S. Pat. No. 10,201,564.

In fact, gaseous NO, when inhaled by a patient who requires it, typically a patient suffering from PPHN, ARDS or PH, dilates the pulmonary vessels and thereby increases the blood oxygenation by improving the pulmonary gas exchange.

Gaseous NO is usually stored in a pressurized gas cylinder, in a form diluted in nitrogen ($N_2$), that is to say in the form of $NO/N_2$ mixtures. Traditionally, the volume concentration of NO in a $NO/N_2$ mixture stored in a pressurized gas cylinder is between 100 and 10,000 ppmv, generally between 200 and 1000 ppmv, for example 800 ppmv. (i.e. ppmv=ppm by volume).

In order to permit administration of NO, the $NO/N_2$ mixture is added to a gaseous flow containing oxygen ($O_2$) in a content of about at least 21% by volume, typically air or a $N_2/O_2$ mixture, and the final flow thus obtained (i.e. $NO/O_2/N_2$) is administered by inhalation to the patient via a respiratory interface, such as a breathing mask or a tracheal intubation tube.

The concentration of NO in the final flow inhaled by the patient corresponds to a dosage that is determined by a physician or the like. In general, the concentration of NO in the gas inhaled by the patient is between 1 and 80 ppm by volume (ppmv), depending on the population treated, i.e. neonates or adults, and also on the disease that is to be treated.

The final mixture administered to the patient is generally obtained by means of a NO delivery device associated with a mechanical ventilator, as described by U.S. Pat. No. 5,558,093. The NO delivery device injects the desired quantity of $NO/N_2$ mixture into the flow of air or $NO/N_2$ mixture coming from the mechanical ventilator, that is to say a respiratory assistance device or the like. The NO delivery device is supplied with $NO/N_2$ mixture by the one or more gas cylinders containing the $N_2/NO$ mixture.

Generally, the NO delivery device supplies a $NO/N_2$ mixture to a NO injection module placed in the inhalation branch of the patient circuit connected fluidically, on the one hand, to the mechanical ventilator and, on the other hand, to the respiratory interface (e.g. tube, mask, etc.) delivering the final gaseous mixture containing the NO at the desired dosage.

In a hospital environment, it is necessary not only for the one or more gas cylinders containing the NINO mixture to be brought quickly to the patient, but also the NO delivery device which is supplied with NO (i.e. $NO/N_2$ mixture) by said one or more gas cylinders.

At present, the gas cylinders and/or medical apparatuses are moved/transported within hospitals or the like either manually by the medical personnel or by means of a transport cart.

Thus, EP2574361 discloses a medical cart comprising a base mounted on castors and surmounted by a wall defining a seat of U-shaped cross section for receiving a gas cylinder. Two carrying arms connect the wall of the U-shaped seat to a tray on top of the cart. Medical instruments can be placed on the tray.

EP1977712 also discloses a mobile cart in the form of a cabinet mounted on castors and comprising internal compartments. One of the compartments accommodates gas cylinders, and another accommodates a vacuum pump. The upper wall of the cabinet, forming a roof, forms a tray which is used to receive medical instruments or apparatuses. The gas cylinders and the vacuum pump are connected via channels arranged in the cabinet, gas or vacuum distribution outlets carried by a side wall of the cabinet.

However, these types of carts are not designed to permit transport of quite heavy or bulky medical apparatuses in good conditions of safety, that is to say without risk of the apparatuses falling from the tray.

Furthermore, EP3854368 and EP3854660 describe a mobile cart in the form of a cabinet mounted on castors and comprising internal compartments. The upper wall of the cabinet, forming a roof, comprises an opening communicating with one of the internal compartments, in order to permit the insertion therein of a flexible gas distribution hose connected to a gas distribution system on top of the cart and supplied with gas by a gas cylinder arranged in the cabinet. However, this cart does not permit transport of equipment.

Other more rudimentary carts for one or more gas cylinders are disclosed by FR2926728 and FR2910362.

It will be appreciated that these carts are unsuitable and/or impractical for use in treatment by inhalation of gaseous NO, which requires in particular the movement or transport of one or more pressurized gas cylinders, such as one or more cylinders with NO (i.e. $NO/N_2$ mixture), and a gas delivery apparatus, in particular a NO delivery device, within a hospital building or the like.

Also known is document US2016/0310693, which discloses a mobile cart comprising a base, with storage locations for accommodating cylinders of gas, in particular of NO, and castors. A single column extends upwards from the base and is surmounted by a plate structure on which is arranged a post carrying a gas delivery apparatus. However, this cart is unsatisfactory. It is not suitable for simultaneous storage and transport of accessories, manuals or other items necessary for the treatment of the patient. Moreover, given that the single column has to hold the gas cylinders and at the same time carry the support plate, the post and the gas delivery apparatus, that is to say has to support a weight of several kg, typically at least 5 to 10 kg, it necessarily has to be robust and have considerable dimensions, which fact increases the weight and the overall size of the cart, sets the cylinders at a distance from one another by necessarily increasing the size of the base, and complicates the manipulation of the cart by the medical personnel. Finally, the fact that the column is off-centre and supports all the weight of the plate structure, the post and the NO delivery apparatus, there are safety risks posed by the existing imbalance, in particular a risk of the plate structure breaking if a user leans on the plate structure, thus increasing the weight that has to be supported by the single column.

Furthermore, US2009/0302178 proposes a more rudimentary cart structure which comprises a base, with a single column extending upwards from the base and being surmounted by a plate structure. Stowage cabinets are arranged between the base and the anchoring structure. However, this cart does not permit the transport of gas cylinders, and therefore it is not designed for treatment using gas stored in cylinders.

There is therefore a need for an improved mobile medical cart permitting simultaneous transport of one or preferably several pressurized gas cylinders, in particular cylinders of NO (i.e. NO/$N_2$ mixture), and a gas delivery apparatus, in particular a NO delivery device, and also accessories, technical manuals or user manuals, devices for patient care (e.g. insufflation balloon or bag valve mask (BVM), hose, sensor, user kit, etc.) or the like, so as to be able to deliver the gas (i.e. the NO) to a patient requiring same in the context of a treatment by inhaled NO, in particular in intensive care units.

In other words, the problem is to make available an improved mobile medical cart, i.e. improved in particular in terms of ergonomics and safety, which is better adapted to treatments by gas, in particular by inhaled NO in or on the way to intensive care units.

SUMMARY OF THE INVENTION

According to the invention, a mobile cart is proposed, i.e. a transport unit designed to roll along the floor during its movements, comprising
- a base or chassis comprising at least one storage location for accommodating at least one gas cylinder,
- several castors for moving the cart on the floor,
- a main column extending upwards from the base,
- a stowage cabinet,
- an anchoring structure arranged at an upper end of the main column, also called a tray structure,
- a support post carried by the anchoring structure and extending upwards, said support post carrying fixing means which are configured for fixing a gas delivery apparatus thereto, and
- at least one manual gripping handle allowing a user to manipulate the cart, in particular to steer it, pull it or push it, during movements on the floor.

According to the invention, the cart preferably also comprises the following features:
- the stowage cabinet is arranged along the main column,
- a secondary column extends upwards from the base and is rigidly connected to the anchoring structure, and
- the secondary column and the main column are arranged spaced apart from each other.

Depending on the embodiment under consideration, the cart according to the invention may comprise one or more of the following features:
- the manual gripping handle is fixed to the anchoring structure.
- the manual gripping handle comprises an annular structure, preferably an open annular structure.
- the manual gripping handle is dimensioned so as to be grasped manually by a user.
- the manual gripping handle has an elongate shape, preferably tubular, and has a diameter of between 2 and 6 cm.
- the cabinet is flat, its width L preferably equal to at least twice its thickness E (L≥2.E), more preferably at least three times its thickness E (L≥3.E), in particular at least 4 times its thickness E (L≥4.E).
- the cabinet has the general shape of (approximately) a rectangular parallelepiped.
- the cabinet defines an internal volume.
- the cabinet comprises a front wall or face and lateral borders arranged at the periphery of the front wall and extending towards the main column, that is to say it does not have a rear wall.
- according to another embodiment, the cabinet comprises a front wall or face and a rear wall or face that define between them an inner space, said front and rear walls being connected to each other by lateral borders arranged at the periphery of said front and rear walls.
- the anchoring structure comprises a tray or roof on top of the main column, for example a plate or the like.
- the anchoring structure has a substantially triangular general shape or another shape.
- the anchoring structure has an open annular shape rigidly connected to the manual gripping handle via one or more joining arms.
- the anchoring structure has a substantially triangular general shape and comprises joining arms which continue its vertices and which are rigidly connected to the manual gripping handle.
- the main column extending upwards from the base is fixed to said base.
- the secondary column extending upwards from the base is fixed to said base.
- the main column extends between the base and the anchoring structure.
- the secondary column extends between the base and the anchoring structure.
- the secondary column and the main column are arranged substantially parallel to each other, that is to say parallel or approximately parallel.
- the secondary column is thinner than the main column, in particular its cross-sectional area is smaller than that of the main column.
- the main column and the secondary column have circular, rectangular, square or other cross sections.
- the main column and the secondary column are profiled elements of circular, rectangular, square or other cross section.
- the secondary column has a cross section of the order of 3 to 8 cm, typically of 3 to 6 cm, for example a square cross section of 4×4 cm.
- the main column has a cross section of the order of 3 to 25 cm, for example a rectangular cross section of 4×16 cm.
- the main column and the secondary column are elongate profiled elements.
- the main column and the secondary column are profiled elements made of aluminium alloy. However, another material could possibly be suitable.
- the fixing means carried by the support post comprise a perforated panel allowing the gas delivery apparatus to be fixed by screwing.
- the support post comprises means for adjustment in height, that is to say axial adjustment, of the perforated panel and means for blocking it in the desired position, so as to be able to adjust its height, and therefore that of the gas delivery apparatus which it carries, during use, for example in order to adapt the height of the panel and/or of the gas delivery apparatus to the height of the user.

it comprises at least one gas cylinder accommodated in said at least one location of the base, preferably a gas cylinder containing an $NO/N_2$ mixture.

it comprises two cylinders of $NO/N_2$ mixture accommodated in two locations of the base.

the secondary column is arranged, i.e. situated, between the two cylinders of $NO/N_2$ mixture.

each cylinder of $NO/N_2$ mixture is fixed, directly or indirectly, to the main column and/or to the secondary column, that is to say to one column, to the other column or to both columns, preferably to both columns.

it additionally comprises a cylinder of oxygen ($O_2$) in an additional location of the base.

the cylinder of oxygen ($O_2$) is fixed, directly or indirectly, to the secondary column.

the secondary column is accommodated in a location defined between the two cylinders of $NO/N_2$ mixture and the cylinder of oxygen ($O_2$).

it comprises a gas delivery apparatus fixed to the fixing means of the support post, in particular an apparatus for delivery of a $NO/N_2$ mixture.

it comprises at least three castors, preferably at least four castors, for example four castors or eight castors arranged in pairs.

the castors are fixed to extensions rigidly connected to the base and projecting in a direction away from the base.

the extensions form legs.

each extension comprises at least one castor or a pair of castors.

the castors or pairs of castors are arranged on feet fixed to the extensions forming the legs.

the fixed feet are mounted pivotably on the extensions.

the extensions and the base are formed in one piece, preferably of metal or metal alloy, for example an aluminium alloy or the like. According to another embodiment, they can be made by injection moulding of plastic material (i.e. polymer). Of course, the extensions can also be independent and fixed to the base, for example by screwing or other means.

the one or more feet comprise a blocking device, such as a brake or the like, for blocking the (pairs of) castors in order to prevent the rotation of the latter, by which means it is possible to immobilize the cart and therefore avoid any accidental or inadvertent movement of the latter on the floor.

the one or more feet comprise a control pedal which can be actuated by the user and which cooperates with the blocking device in such a way as to activate or deactivate it when a user actuates the control pedal.

the cart comprises a vertical axis (AA) when it is in an upright position on the ground.

the support post is arranged or oriented (substantially) along the vertical axis (AA).

the support post is tubular, in particular cylindrical.

the fixing means comprise a perforated fixing panel, for example of the VESA type, allowing an apparatus to be fixed by screwing.

the support post is situated in the upper part of the cart, above the cabinet.

the cabinet projects along the vertical axis (AA) along the main column.

the cabinet extends substantially between the base and the anchoring structure.

the cabinet is fixed to the main column, preferably by screwing or the like.

the cabinet is made of polymer.

the cabinet comprises one or more internal stowage compartments accessible from the outside via one or more openings which are formed in the front face of the cabinet and provided with doors.

each door is mounted pivotably, preferably on a horizontal axis (BB).

the cabinet has a height (H) of between 60 and 110 cm, a width (L) of between 15 and 60 cm, and a thickness (E) of between 5 and 18 cm.

the one or more gas cylinders contain a gaseous mixture $NO/N_2$ containing 100 to 10,000 ppmv of NO and nitrogen for the rest, preferably 100 to 2000 ppmv of NO.

the one or more gas cylinders, i.e. each cylinder containing $NO/N_2$ mixture, contains a gaseous mixture $NO/N_2$ containing 100 to 1000 ppmv of NO and nitrogen for the rest, preferably 200 to 1000 ppmv of NO.

the one or more gas cylinders contain gas at a pressure of between 5 bar and at least 200 bar abs.

the one or more gas cylinders are equipped with a gas distribution valve, in particular an integrated pressure regulator (IPR).

the one or more gas cylinders are equipped with a protective cap for protecting the gas distribution valve.

the one or more gas cylinders have an ogive shape, i.e. a cylindrical body surmounted by a narrowed portion forming a neck with a gas inlet/outlet opening that communicates with the internal storage volume of the gas cylinder.

the one or more gas cylinders are fixed, directly or indirectly, to the cart, typically to the main column and/or to the secondary column, preferably by connecting means, for example one or more straps provided with connectors or the like.

the mobile cart is designed to be rolled along the floor when it is manipulated and displaced, typically pushed or pulled, by a user, in particular a caregiver, for example a physician, a nurse or the like, within a hospital building or the like.

the base of the cart is situated at the lower part of the cart, that is to say at the bottom of the cart, situated in immediate proximity to the floor.

the base of the cart comprises a platform where the storage locations are formed.

the storage locations are dimensioned to each receive a gas cylinder in an upright position.

the storage locations have a disc shape or similar.

the cart comprises three storage locations arranged in a triangle.

according to one embodiment, the support post is accommodated in a tubular structure which forms a sleeve and which is carried by the anchoring structure. The support post is mounted slidably in the tubular structure forming the sleeve, so as to permit height adjustment.

according to another embodiment, the support post is mounted on the anchoring structure in such a way as to be fixed axially but to be movable in rotation about the vertical axis (AA).

the support post is mounted in its central region of the anchoring structure.

the base additionally comprises a footrest making it easier for the user to set the cart in motion, when it is at a standstill on the ground, by exerting a pushing force on it with his foot.

the cart comprises a front face and a rear face. The rear face is the one directed towards the user when the latter is pushing the cart in order to move it by rolling along the floor.

the footrest is situated to the rear face of the cart.

the gas cylinders are situated to the front face of the cart.

the cabinet is situated to the rear face of the cart.

the gas distribution valves of the gas cylinders are connected fluidically to the gas delivery apparatus via flexible hoses, so as to supply the gas delivery apparatus with NO/N$_2$ mixture and with oxygen.

The invention also relates to the use of a mobile cart according to the invention for transporting one or more cylinders of pressurized gas, such as a NO/N$_2$ mixture, and/or oxygen, and a gas delivery apparatus, typically for delivery of NO intended to be administered to an adult, adolescent, child or neonate suffering from PPHN, ARDS or PH or another pathology, via a respiratory circuit supplied with a gas containing at least 21% by volume of oxygen such as air or a N$_2$/O$_2$ mixture coming from a medical ventilator.

BRIEF DESCRIPTION OF THE DRAWINGS

The invention will now be better understood from the following detailed description, which is given by way of non-limiting illustration, with reference to the appended figures, in which.

DESCRIPTION OF THE PREFERRED EMBODIMENTS

FIG. 1 to FIG. 7 show schematic views of an embodiment of a mobile cart 1 according to the invention which is intended for the hospital sector or similar and which is designed to be easily moved along the floor when it is manipulated, typically pushed or pulled, by a caregiver, for example a physician, a nurse of the like, within a hospital building or the like.

In FIG. 1 to FIG. 5, the cart 1 is bare, that is to say not fitted out, whereas in FIG. 6 and FIG. 7 it is fitted out with its equipment, namely in this case three gas cylinders 200 and a gas delivery apparatus 100, as explained below.

The mobile cart 1 of the invention comprises, in the lower part, a base 2 or chassis comprising several castors 30, in this case pairs of castors 30, for moving the cart 1 by rolling it along the floor. The (pairs of) castors 30, i.e. small wheels, are arranged on feet 32 that are fixed pivotably to extensions 31 of the base 2 or legs.

Advantageously, the extensions 31 or legs are formed in one piece with the rest of the base 2, for example by injection moulding or another technique. The base 2, including the extensions 31, can be made from polymer.

Preferably, the feet 32 comprise a blocking device, such as a brake or the like, for blocking the castors 30 in order to prevent the rotation of the latter, by which means it is possible to immobilize the cart on the floor and therefore avoid any accidental or inadvertent movement of the latter. The activation or, conversely, the deactivation of the device for blocking the castors 30 is effected by means of a control pedal 33 that can be actuated by the user, especially when the user presses on the latter with their foot.

Figure 2:
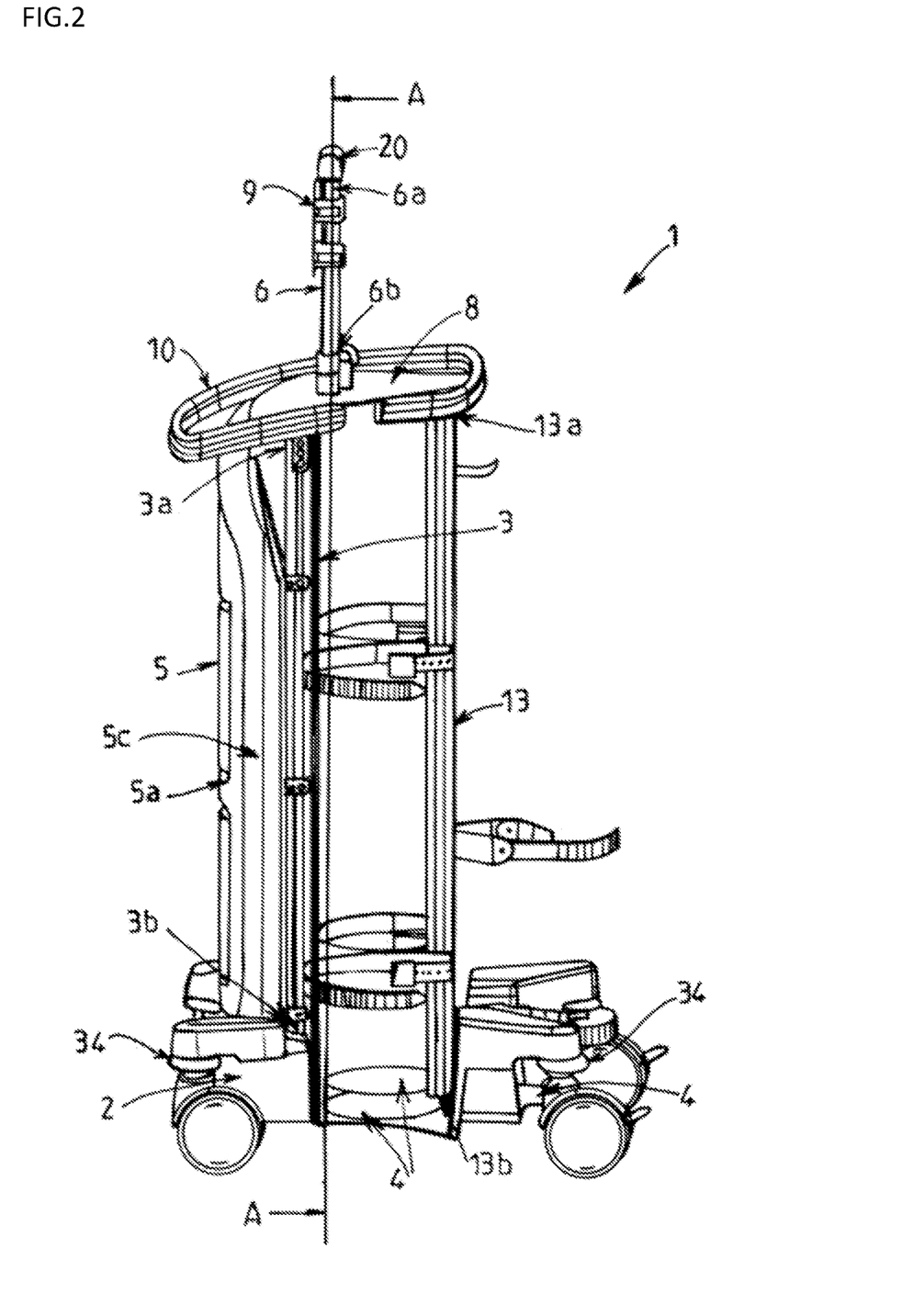
FIG. 2 shows the cart of FIG. 1 viewed from the side.
Figure 3:
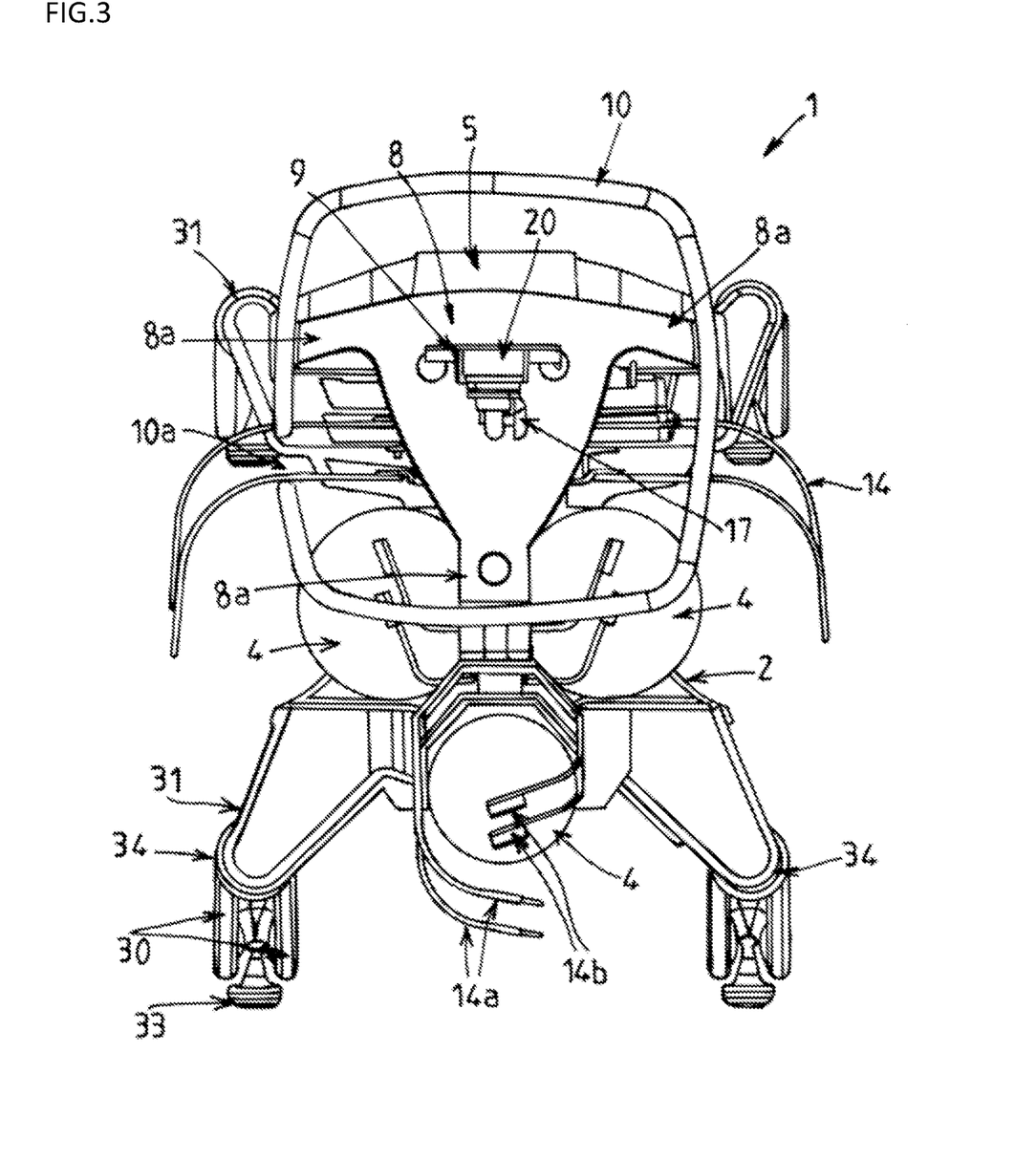
FIG. 3 shows the cart of FIG. 1 viewed from above.
Figure 4:
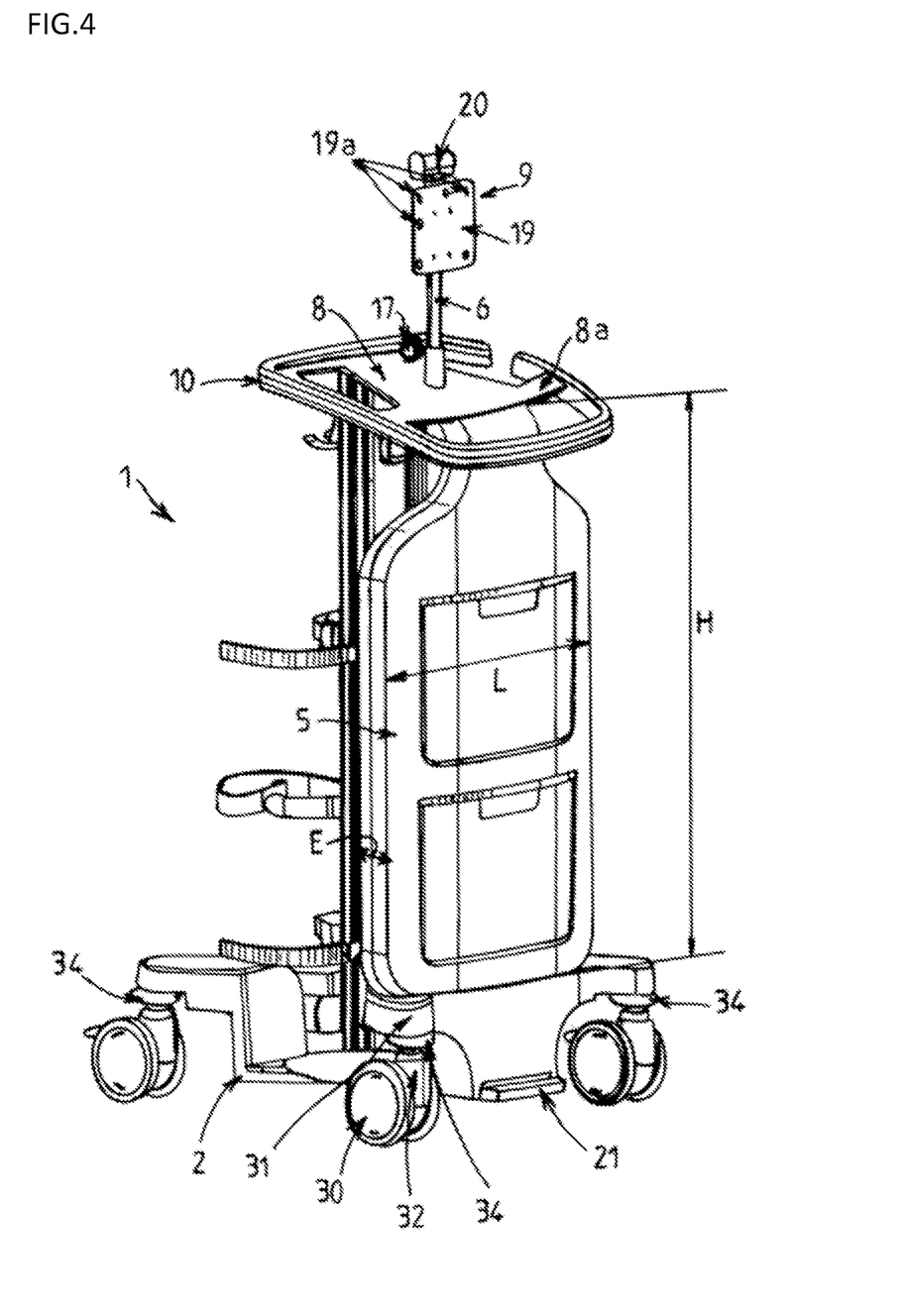
FIG. 4 shows the cart of FIG. 1 in a ¾ front view.

As is illustrated in FIG. 2 to FIG. 4, the feet 32 also carry shock-absorbing devices 34, which are arranged between the feet 32 and the extensions 31 and serve to absorb the shocks that may occur during the movements of the cart 1, when the latter collides with other objects such as another cart, a bed, a piece of furniture, a door, etc.

Moreover, the cart 1 comprises a front face and a rear face, the rear face being situated towards the user when the latter is pushing the cart 1 in order to move it by rolling it along the floor. Thus, the front face of the cart 1 is the face situated to the right in FIG. 2, while the rear face is the one situated to the right in FIG. 2.

Figure 7:
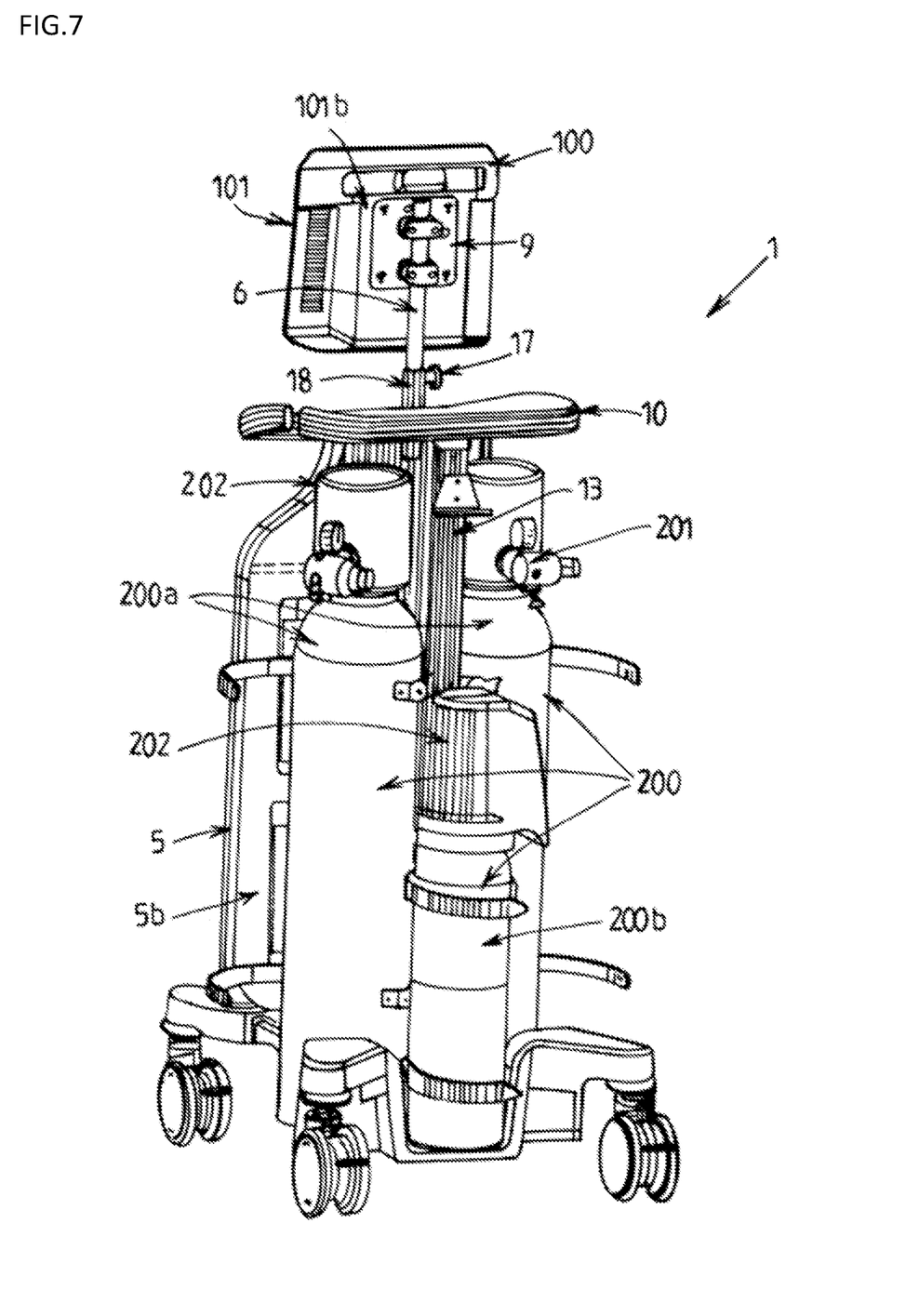
FIG. 7 shows the cart of FIG. 6 in an ¾ rear view.

Moreover, the base 2 also comprises several storage locations 4 for accommodating containers holding pressurized gas, in this case three gas cylinders 200 comprising two cylinders 200a containing a NO/N$_2$ mixture, for example a NO/N$_2$ mixture containing from 100 to 1000 ppmv of NO and nitrogen for the rest, and a cylinder 200b containing oxygen, as is illustrated in FIG. 7.

The storage locations 4 for the gas cylinders 200; 200a, 200b are provided at the front face of the cart 1.

The gas cylinders 200 have a cylindrical body and generally an ogive shape. They are made, for example, of aluminium alloy, of composite materials or of steel. Each cylinder 200 is equipped with a gas distribution valve 201 (partially visible), for example an IPR, arranged at its neck and comprising the orifice communicating fluidically with the internal volume of the cylinder, and preferably a protective cap 202 for protecting the gas distribution valve 201 against shocks in particular. The gas distribution valves 201 of the gas cylinders 200; 200a, 200b are connected fluidically to the gas delivery apparatus 100 via flexible hoses, so as to supply the gas delivery apparatus 100 with NO/N$_2$ mixture and with oxygen.

The storage locations 4 are formed in the base 2. They each comprise a small platform, preferably in the shape of a disc, which can be clearly seen in FIG. 3 and on which each gas cylinder 200 rests in an upright position. Preferably, the storage locations 4 are in a position low down, that is to say in immediate proximity to the floor, in order to facilitate changes of cylinders 200, i.e. loading/unloading, so as to avoid the user having to lift many cylinders 200, especially when they are full and heavy, in order to position them on said storage locations 4.

Advantageously, the storage locations 4 do not comprise an outer border, once again so as to facilitate the operations of changing cylinders.

The gas cylinders 200 are kept in place on the cart 1 by means of fastening devices 14, here straps 14a provided with connectors 14b, as are explained below; however, other fastening devices may be suitable. By fastening the gas cylinders 200, it is possible to prevent them from falling, especially during movements of the cart 1.

The cart 1 additionally comprises a main column 3 extending upwards from the base 2, that is to say vertically along the vertical axis (AA) of the cart 1. The main column 3 is rigidly connected at its lower end 3b to the base 2, for example being fixed there by screwing or the like.

An anchoring structure 8, also called a tray structure, is arranged at the upper end 3a of the main column 3. Here, the anchoring structure 8 forms a tray or a horizontal roof on top of the main column 3 and a secondary column, as is explained below. For example, the anchoring structure 8 is a plate or similar, here of a generally triangular shape (cf. FIG. 3) comprising joining arms 8a which are arranged at its three vertices and which connect to a manual gripping handle 10, as is set out in detail below; another shape could of course be suitable.

A stowage cabinet 5 is arranged along the main column 3. It is fixed there by screwing, for example. The stowage cabinet 5 extends between the base 2 and the anchoring structure 8. In other words, the cabinet 5 extends upwards from the base 2 along the vertical axis (AA) of the cart 1.

The cabinet 5 advantageously has a flattened shape in order to limit the size of the assembly. For example, as is illustrated in FIG. 4, it can have a height (H) of between 60 cm and 110 cm, a width (L) of between 15 cm and 60 cm, and a thickness (E) of between 5 cm and 18 cm. In all cases, its width (L) is equal to at least twice its thickness (E), i.e. L≥2.E.

In addition, the cabinet 5 can be made from polymer or another material, for example composite material.

Figure 1:
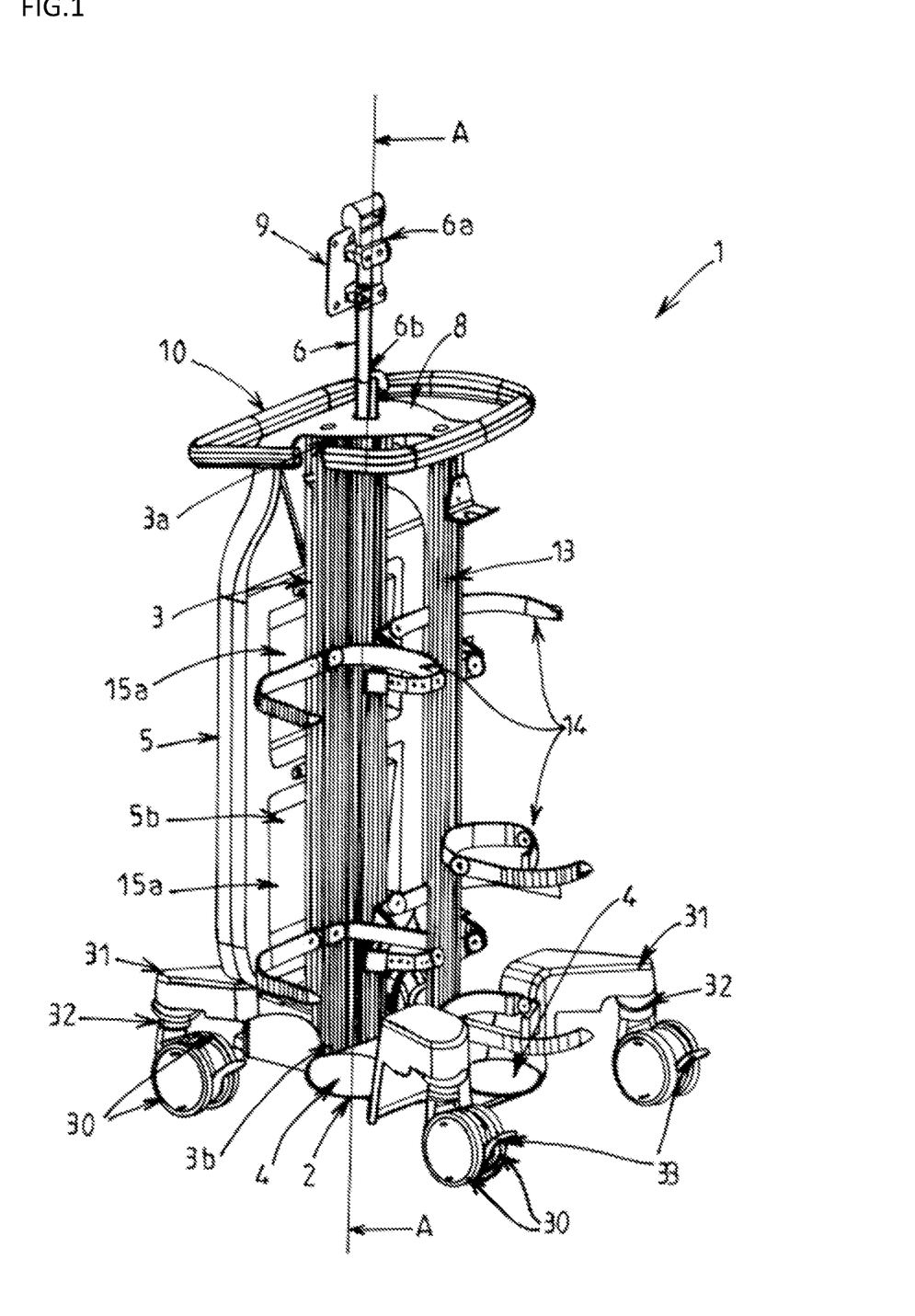
FIG. 1 is a schematic view of an embodiment of a mobile cart according to the invention, in a non-equipped state, in a ¾ rear view.

Here, the cabinet 5 comprises a main wall 5a, also called the front face 5a, bordered at its periphery by side walls 5c projecting in the direction of the main column 3 in such a way as to delimit an internal space or volume which, in the proposed embodiment, is open towards the rear 5b, that is to say towards the main column 3 and the cylinders 200. In FIG. 1, the internal stowage compartments 15a are distinguished via the one or more rear openings.

According to another embodiment (not shown), the cabinet 5 can comprise, in addition to the front face or wall 5a, an additional rear wall that will occlude the one or more rear openings in such a way as to close the cabinet 5. In this case, the front face or wall 5a and the additional rear face are opposite each other and are connected to each other by peripheral borders 5c, being spaced apart from each other so as to delimit between them the internal space comprising the internal stowage compartments 15a. The rear face 5b is thus situated opposite the main column 3 and is preferably fixed thereto, that is to say also towards the cylinders 200.

Figure 5:
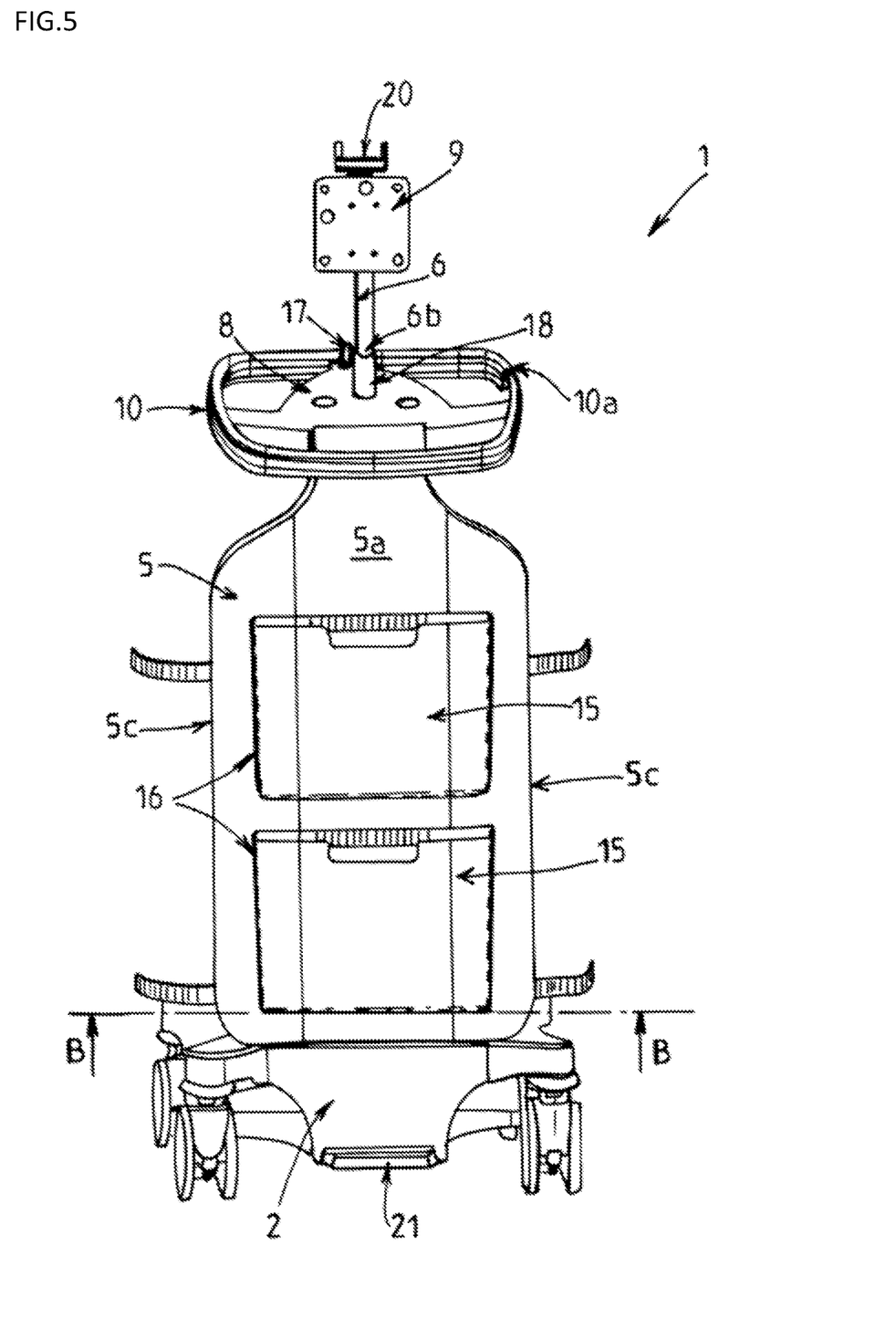
FIG. 5 shows the cart of FIG. 1 seen from the front.

As is illustrated in FIG. 5, the front face 5a of the cabinet 5 here comprises two doors 15, for example pivoting or tilting doors, for example doors pivoting or tilting about hinges situated at the bottom of the doors 15 and horizontal shafts (BB) perpendicular to the vertical axis (AA). Of course, the cabinet 5 could comprise a greater or lesser number of doors 15. The doors 15 thus open on the front face 5a of the cabinet 5, that is to say the rear side of the cart 1.

The doors 15 close openings 16 (not visible) formed in the front face 15a of the cabinet 5 and giving access to the internal stowage compartments 15a which are used to store medical items, such as accessories or the like, for example gas administration kits, breathing mask, tracheal tube, hoses, instructions for use, connectors, etc. These assemblies form nested stowage receptacles.

Moreover, the cart 1 also comprises a support post 6 carried by the anchoring structure 8, in particular fixed to the anchoring structure 8 in the region of its distal end 6b. The support post 6 extends upwards, that is to say along the vertical axis (AA). It has here a cylindrical shape, and the distal end 6b of the support post 6 passes through the anchoring structure 8.

Figure 6:
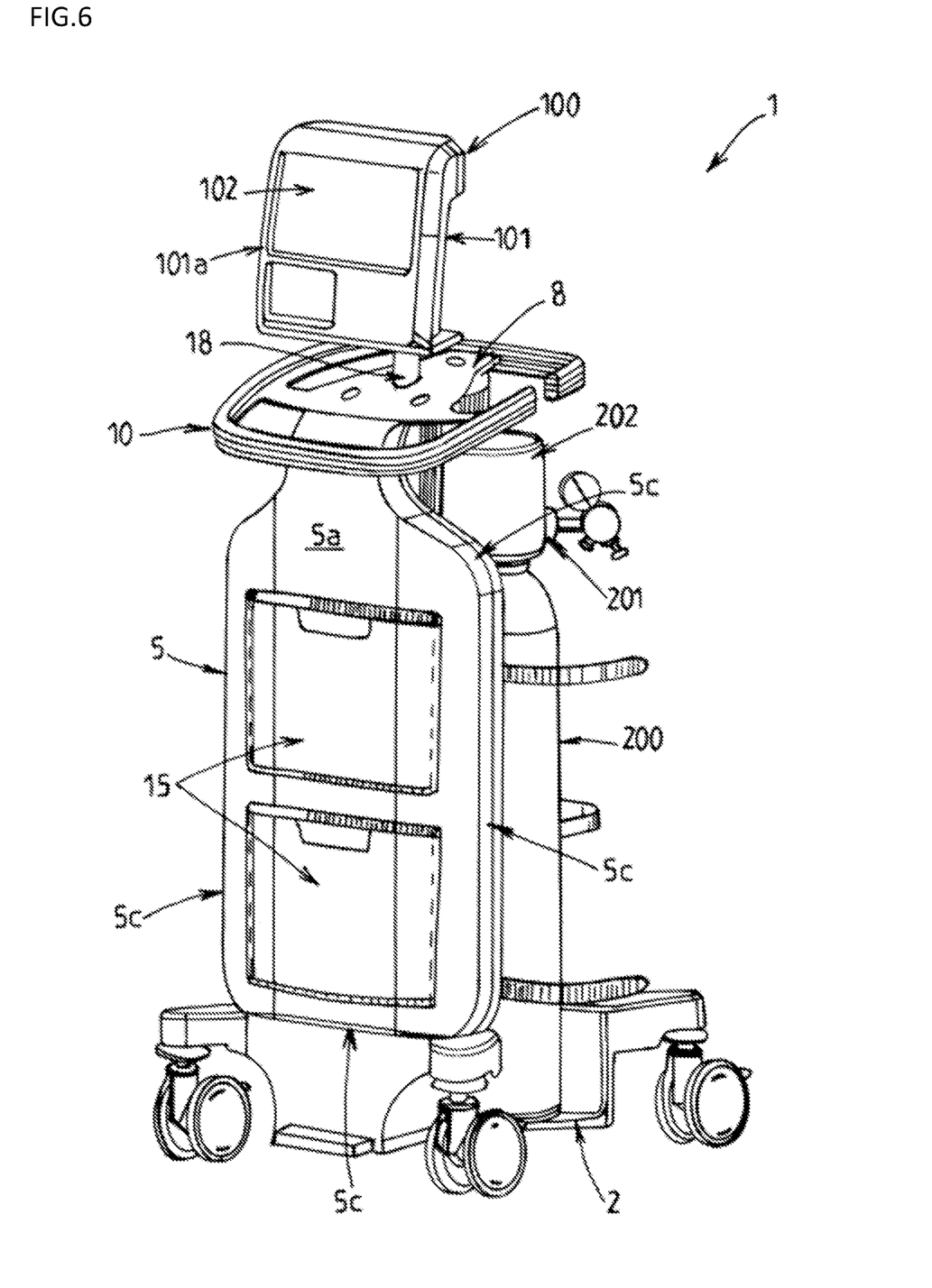
FIG. 6 shows the cart of FIG. 1, in a ¾ front view, equipped with gas cylinders and with a gas delivery apparatus.

According to one embodiment, as is shown in FIG. 5 to FIG. 7, the distal end 6b of the support post 6 is accommodated in a tubular structure 18 forming a sleeve carried by the anchoring structure 8, preferably in its central part. Thus, the support post 6 can slide in the tubular structure forming the sleeve 18, such that the support post 6 is able to be set or adjusted in height in order to be able to be retracted or extended to a greater or lesser extent along the vertical axis AA, that is to say it is telescopic. Preferably, a locking device can be provided in order to keep the support post 6 in the desired position along the post 6, for example a rotary member of the rotary button type 17, which can be actuated by the user and is arranged at the structure forming the sleeve 18.

According to another embodiment, the support post 6 is fixed to the anchoring structure 8, preferably in its central region, in such a way as to be movable only in rotation about its axis (AA), that is to say it cannot move axially along the axis (AA) and is movable only about said axis (AA). Here too, a locking device can preferably be provided in order to keep the support post 6 in the desired position about the post 6.

According to yet another embodiment, the support post 6 is fixed in a non-movable manner to the anchoring structure 8, for example by screwing, welding or the like.

Moreover, the support post 6 can comprise means for adjustment of the height along the axis (AA) and/or of the angle and/or of the orientation of a support panel 19 carrying a gas delivery apparatus, as is explained below, and means for blocking in the desired position, that is to say at the desired height, and/or at the desired angle and/or in the desired orientation, such as a rotary member of the rotary button type which can be actuated by the user, cooperates with the post 6 and is preferably connected to a locking pin for securing the position. Of course, other adjusting/blocking systems may be used.

Being able to adjust the height of the support panel 19 along the support post 6, that is to say along the axis (AA), is advantageous since it can make it easier for the user to read the screen 102 situated on the front face 101a of the gas delivery apparatus 100 carried by the support panel 19, as is illustrated in FIG. 6. In fact, the support post 6, in particular the support panel 19, is intended to receive and carry a gas delivery apparatus 100, in particular for delivering NO/N$_2$ mixture. To do this, in order to be able to fix the gas delivery apparatus 100 there as illustrated in FIG. 6 and FIG. 7, means 9 for fixing the apparatus, in this case a support panel 19, are provided on the support post 6, preferably in the region of its free end 6a.

The gas delivery apparatus 100 is intended to be fluidically connected to the patient circuit fluidically connecting a medical ventilator to a respiratory interface such as a mask or a tracheal tube delivering the gas, for example a gaseous mixture based on NO, oxygen and nitrogen, to the airways of the patient who is to be treated. The gas delivery apparatus 100 is supplied with gas, in particular with NO/N$_2$, by one or more gas cylinders 200 via one or more flexible gas-conveying hoses to be connected to the outlet port of the one or more gas distribution valves 201.

Advantageously, as has already been mentioned, the fixing means 9 comprise a support panel 19 comprising orifices or perforations 19a for fixing by screwing, for example of the VESA type (Video Standards Electronics Association). For example, the support panel 19 has a rectangular shape and comprises several continuous perforations 19a intended to receive fixing screws for screwing into screw holes provided on the apparatus 100, for example formed in the rear face 101b of the body 101 of the apparatus 100, as is illustrated in FIG. 7.

The support post 6 can also comprise, in the region of its free end 6a, attachment means 20, that is to say fixing means, such as a tubular zone or the like, as is illustrated in FIG. 4 and FIG. 5, intended to cooperate with a fastening, i.e. attachment, system which is provided on certain apparatuses 100, serving to and/or making it possible to fasten them, for example suspend them, on tubular structures such as the rung of a bed or the like.

Furthermore, in order to allow a user such as a caregiver to easily steer the cart 1 during its movement along the floor of a hospital building for example, a manual gripping handle 10 is provided, which the user can grasp with his hands in order then to manipulate the cart 1, typically to push it or pull it.

Here, the manual gripping handle 10 is rigidly connected to the anchoring structure 8 via the joining arms 8a. It has an annular overall shape. It is arranged around the support post 6 and the anchoring structure 8. The gripping handle 10 comprises one or more openings 10a permitting the passage of cables and/or of flexible hoses or the like, in order to gather these in a bundle in the internal space of the ring formed by the manual gripping handle 10.

In other words, the gripping handle 10 has the shape of an open ring which is dimensioned to allow it to be grasped manually by the user. For example, its diameter is of the order of about 2 to 5 mm. As will be seen, the handle 10 has an annular overall shape, i.e. the shape of an open ring, and is arranged all around the anchoring structure 8, which is advantageous because this configuration allows a user to grasp the cart 1 from all sides, that is to say irrespective of the user's position in relation to the cart 1, for example in order to realign it or reposition it in an operating theatre, for example of a hospital or the like.

As has already been mentioned, in order to strengthen the structure, the cart 1 furthermore comprises a secondary column 13 which also extends upwards from the base 2, that is to say along the vertical axis (AA), and is rigidly connected to the base 2 at its lower end 13b, for example by screwing or the like. Here too, the secondary column 13 is rigidly connected to the anchoring structure 8, that is to say the tray structure, at its upper end 13a.

In other words, the main column 3 and the secondary column 13 are arranged (approximately) parallel and offset relative to each other, i.e. spaced apart and fixed on the one hand to the base 2 and on the other hand to the anchoring structure 8, for example by screwing through the plate forming the anchoring structure 8.

Preferably, the distance between the main column 3 and the secondary column 13 is several centimetres, typically between about 10 and 30 cm, typically between about 15 and 25 cm.

The main column 3 and the secondary column 13 have an elongate shape, typically a tubular structure of square, rectangular, circular or some other cross section. They have a length of the order of about 50 to 120 cm. They are made from one or more strong materials, for example of polymer or of metal.

Preferably, the secondary column 13 is thinner than the main column 3; for example, the secondary column 13 has a square cross section of the order of 4×4 cm, whereas the main column 3 has a rectangular cross section of the order of 4×16 cm.

Using two parallel columns 3, 13 to support the anchoring structure 8 is advantageous compared to a single column according to the prior art, since it makes it possible to increase the solidity and robustness of the assembly by distributing, between these columns 3, 13, the weight that is exerted on them, i.e. the weight of the post 6, of the anchoring structure 8, of the panel 19, of the gripping handle 10 and of the apparatus 100.

In other words, using two parallel columns 3, 13 makes it possible to shift, i.e. centre, the mass (i.e. weight) of the post 6, of the anchoring structure 8, of the panel 19, of the gripping handle 10 and of the apparatus 100 towards the centre of the cart 1, by which means it is possible to eliminate any imbalance that may exist with carts having a single column in the prior art.

Moreover, using two columns 3, 13 also allows the two cylinders 200a to be brought closer together, thereby reducing the dimensions of the base 2 by reducing its footprint, hence also reducing the overall size and the total weight of the cart 1.

Advantageously, fastening devices 14, such as straps 14a with connectors 14b or any other suitable fixing device, are carried by the main column 3 and the secondary column 13. Preferably, their vertical positioning on the columns 3, 13 can be adjusted axially so as to be able to firmly and effectively fix cylinders 200 of different sizes.

In order to ensure good safety of use, the cylinders of $NO/N_2$ are fixed by fastening devices 14 to the main column 3 and/or to the secondary column 13, preferably to both columns 3, 13. Furthermore, it is sufficient to fix the oxygen cylinder 220b only to the secondary column 13.

In addition, it will further be seen from FIG. 4 that the base 2 also comprises a footrest device 21 making it easier for the user to set the cart 1 in motion, when it is at a standstill on the floor, by exerting a pushing force on it with his foot. The footrest 21 is situated at the rear of the cart 1, that is to say opposite the gas cylinders.

The cart 1 can also comprise a system for emptying the hoses, such as a cylindrical stub on which the user presses the free end of the flexible gas hose in order to activate the check valve which is arranged there, in such a way as to cause purging or emptying of the residual gas located in the hose, which residual gas can then be evacuated to the surrounding atmosphere.

Generally, the cart 1 is particularly suitable for use in a hospital environment, especially in the context of therapeutic treatment of an adult, adolescent, child or neonate suffering from a pulmonary disease such as PPHN, ARDS or PH in cardiac surgery, with administration by inhalation of gaseous NO to the patient requiring same, so as to dilate the pulmonary vessels and thereby increase the blood oxygenation by improving the pulmonary gas exchange.

The invention claimed is:

1. A mobile cart comprising:
a base comprising at least one storage location for accommodating at least one gas cylinder,
several castors for moving the cart on a floor,
a main column extending upwards from the base,
a stowage cabinet,
an anchoring structure arranged at an upper end of the main column,
a support post carried by the anchoring structure and extending upwards, the support post carrying fixing means configured for fixing a gas delivery apparatus thereto,
a secondary column, and
at least one manual gripping handle allowing a user to manipulate the cart,
wherein:
the stowage cabinet is arranged along and fixed to the main column, the stowage cabinet extending substantially between the base and the anchoring structure, the secondary column extends upwards from the base and is rigidly connected to the anchoring structure, and the secondary column and the main column are arranged spaced apart from each other, the distance between the main column and the secondary column being between 10 cm and 30 cm, the stowage cabinet has a flattened shape having a width equal to at least twice its thickness, and the stowage cabinet comprises one or more internal stowage compartments accessible from the outside via one or more openings formed at a front face of the stowage cabinet.

2. The mobile cart according to claim 1, wherein the manual gripping handle is fixed to the anchoring structure.

3. The mobile cart according to claim 1, wherein the manual gripping handle comprises an annular structure.

4. The mobile cart according to claim 1, wherein the anchoring structure comprises a tray on top of the main column.

5. The mobile cart according to claim 1, wherein the fixing means carried by the support post comprise a perforated support plate permitting fixing of the gas delivery apparatus by screwing.

6. The mobile cart according to claim 1, wherein the base additionally comprises a footrest which makes it easier for the user to set the cart in motion, when the cart is at a standstill on the floor, by exerting a pushing force on the cart with one foot.

7. The mobile cart according to claim 1, wherein the one or more openings arranged in a front face of the stowage cabinet are provided with doors.

8. The mobile cart according to claim 1, wherein the secondary column and the main column are arranged spaced apart from each other by a distance of between 15 and 25 cm.

9. The mobile cart according to claim 1, comprising at least one gas cylinder accommodated in said at least one storage location of the base, and/or a gas delivery apparatus fixed to the fixing means of the support post.

10. The mobile cart according to claim 1, comprising two cylinders containing a $NO/N_2$ mixture and one oxygen cylinder, which are arranged on the base in such a way that the secondary column is accommodated in a space situated between said cylinders.

11. The mobile cart according to claim 2, wherein the manual gripping handle comprises an annular structure.

12. The mobile cart according to claim 1, wherein the stowage cabinet has a flattened shape having a width equal to at least three times its thickness.

13. The mobile cart according to claim 1, wherein the stowage cabinet has a flattened shape having a width equal to at least four times its thickness.

14. A mobile cart comprising:

a base comprising at least one storage location for accommodating at least one gas cylinder, several castors for moving the cart on a floor, a main column extending upwards from the base, a stowage cabinet, an anchoring structure arranged at an upper end of the main column, a support post carried by the anchoring structure and extending upwards, the support post carrying fixing means configured for fixing a gas delivery apparatus thereto, a secondary column, and at least one manual gripping handle allowing a user to manipulate the cart, wherein:

the stowage cabinet is arranged along and fixed to the main column, the stowage cabinet extending substantially between the base and the anchoring structure, the secondary column extends upwards from the base and is rigidly connected to the anchoring structure, and the secondary column and the main column are arranged spaced apart from each other.

* * * * *